United States Patent
Brenner

(10) Patent No.: US 7,242,347 B2
(45) Date of Patent: Jul. 10, 2007

(54) LOW POWER DETECTION AND COMPENSATION FOR SATELLITE SYSTEMS

(75) Inventor: Mats A. Brenner, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/667,628

(22) Filed: Sep. 22, 2003

(65) Prior Publication Data

US 2004/0061643 A1  Apr. 1, 2004

Related U.S. Application Data

(60) Provisional application No. 60/413,251, filed on Sep. 24, 2002, provisional application No. 60/413,211, filed on Sep. 24, 2002, provisional application No. 60/413,252, filed on Sep. 24, 2002, provisional application No. 60/413,080, filed on Sep. 24, 2002.

(51) Int. Cl.
*H04B 7/185* (2006.01)
(52) U.S. Cl. .......................... 342/357.03; 342/357.02; 342/357.06
(58) Field of Classification Search ........... 372/357.02, 372/357.03, 357.06
See application file for complete search history.

(56) References Cited

U.S. PATENT DOCUMENTS

| 5,903,654 | A | 5/1999 | Milton |
| 6,121,923 | A | 9/2000 | King |
| 6,219,373 | B1 | 4/2001 | Lee et al. |
| 6,295,024 | B1 | 9/2001 | King et al. |
| 6,313,789 | B1 | 11/2001 | Zhodzishsky et al. |
| 6,331,835 | B1 | 12/2001 | Gustafson |
| 6,384,774 | B1 | 5/2002 | Mutoh |
| 6,407,699 | B1 | 6/2002 | Yang |
| 6,587,075 | B1 * | 7/2003 | Loh et al. .............. 342/357.03 |

FOREIGN PATENT DOCUMENTS

EP    0 436 854 B1    3/1996

OTHER PUBLICATIONS

C.J. Comp et al., Adaptive SNR-based carrier phase multipath mitigation technique, IEEE Transactions on Aerospace and Electronic Systems, vol. 34(1), p. 264-276, Jan. 1998.*

(Continued)

*Primary Examiner*—Thomas H. Tarcza
*Assistant Examiner*—Fred H. Mull
(74) *Attorney, Agent, or Firm*—McDonnell Boehnen Hulbert & Berghoff LLP

(57) ABSTRACT

A system is provided for detecting a low-power error condition in a local area augmentation system (LAAS). The system receives a radio signal from a global positioning system (GPS) satellite and measures the wide band and narrow band power of the radio signal in real time. The system estimates the signal-to-noise ratio of the signal in real time based on average wide band and narrow band power measurements. A low signal-to-noise ratio indicates a low power condition. The system then calculates an error contribution due to the low power condition and sums the error contribution with other error contributions to determine the total error in a navigational measurement. To ensure error overbounding, the system may subtract a confidence offset from the signal-to-noise ratio to obtain a lower confidence limit.

8 Claims, 3 Drawing Sheets

OTHER PUBLICATIONS

J.K. Ray et al., GPS code and carrier multipath mitigation using a multiantenna system, IEEE Transactions on Aerospace and Electronic Systems, vol. 37(1), p. 183-195, Jan. 2001.*

L. Legrand et al., Real-time minimization of the total tracking error in phase an delay lock loops—a second approach of th fast adaptive bandwith algorithm, Navigation (France), vol. 50(197), p. 37-46, Jan. 2002.*

B.W. Parkinson et al. (ed.), Global Positioning System: Theory and Applications, vol. I, American Institute of Aeronautics and Astronautics, Inc., p. 390-394, 1996.*

R. Braff et al., Derivation of ranging source integrity requirements for the Local Area Augmentation System (LAAS), Navigation Journal-of-the-Institute-of-Navigation (USA), vol. 47(4), p. 279-88, Winter 2000-2001.*

"Category I Local Area Augmentation System Ground Facility", Specification FAA-E- 2937 A; United States Department of Transportation Federal Aviation Administration, Apr. 17, 2002.

Ward, Phillip, "Effects of RF Interference On GPS Satellite Signal Receiver Tracking," Understanding GPS Principles and Applications, Chapter 6, pp. 209-236, 1996.

Jakab, A., "An Approach to GPS Satellite Failure Detection," NovAtel Inc.

Hartman, Randy, "LAAS Government Industry Partnership (GIP)," Honeywell International Inc.

Hartman, Randy, "Precision Approach Using Differential GPS," Honeywell International Inc.

Ray, J.K., et al., "Characterization of GPS Carrier Phase Multipath," Department of Geomatics Engineering, university of Calgary, Alberta, Canada, ION NTM-99, San Diego, Jan. 25-27, 1999.

Maurer, M. et al., "Advanced Receiver Technology For Existing and Future Satellite Navigation Systems," International Journal of Satellite Communications, 2000; 18: pp. 347-364.

Upadhyay, Triveni et al., "Test Results on Mitigation of SATCOM-Induced Interference to GPS Operation," http://www1.faa.gov/and/and300/datalink/dlsys/satcom.htm, printed Feb. 4, 2003.

"About the Radio Frequency Interference Monitoring System (RFIMS)," Institute For Telecommunications Sciences, http//www.its.bldrdoc.gov/home/programs/rfims/rfims.html, printed May 2003.

Legrand, Fabrice et al., "Real-Time Minimization of the Total Tracking Error In Phase and Delay Lock Loops—A Second Approach of the Fast Adaptive Bandwidth Algorithm," http://www.recherche.enac.fr/itst/papers/ion_am_01.pdf, printed May 2003.

Saarnisaari, Harri, "Phase Interference Extractor Interference Canceller In DS/SS Code Synchronization," http://www.cwc.oulu.fi/home/projects/AWICS/awics_pub/2000/harri_saarnisaari_euroco00.pdf, printed Mar. 17, 2003.

Landry, Rene Jr. et al., "Analysis of Potential Interference Sources and Assessment of Present Solutions For GPS/GNSS Receivers," 4th Saint-Petersburg on INS, May 26-28, 1997.

Ali-Ahmad, Walid, Ph.D., "RF System Issues Related to CDMA Receiver Specifications," RF Standards, Sep. 1999.

"Adaptive Interference Cancellation : The Latest Weapon Against Interference," http://www.cyberrf.com/appnote/canc/cancAppnote2.htm, printed Feb. 4, 2003, pp. 1-5.

Butsch, Felix, "Innovation: A Growing Concern Radiofrequency Interference and GPS," GPS World, Oct. 2002.

Macabiau, Christophe et al., "Use of MultiCorrelator Techniques For Interference Detection," http://www.recherche.enac.fr/Itst/papers/ion_ntm_2001_interf.pdf, printed Mar. 17, 2003.

Bastide, Frederic et al., "GPS Interference Detection and Identification Using Multicorrelator Receivers," http://www.recherche.enac.fr/ext/Itst/papers/ion_gps_01.pdf, printed on Mar. 10, 2003.

Maenpa, Jon E. et al., "New Interference Rejection Technology From Leica," Leica Geosystems Inc., Sep. 1997.

Ober, P.B. et al., "The Suitability of GPS For Basic Area Navigation," 10th International Technical Meeting of the Satellite Division of the Institute of Navigation, ION GPS-97, Sep. 16-19, 1997.

Volpe, John A., "Vulnerability Assessment of the Transportation Infrastructure Relying On the Global Positioning System," Final Report, U.S. Department of Transportation, Aug. 29, 2001.

Gromov, Konstantin, "GIDL: Generalized Interference Detection and Localization System," Dissertation submitted to the Department of Aeronautics and Astronautics and the Committee on Graduate Studies of Stanford University in partial fulfillment of the requirements for the degree of Doctor of Philosophy, Mar. 2002.

Phlets, Robert Eric, "Multicorrelator Techniques For Robust Mitigation of Threats to GPS Signal Quality," A dissertation submitted to the department of mechanical engineering and the committee of graduate studies of Stanford University in partial fulfillment of the requirements for the degree of Doctor of Philosophy, Jun. 2001.

International Search Report, PCT/US03/30050.

* cited by examiner

LOW POWER DETECTION AND COMPENSATION FOR SATELLITE SYSTEMS

PRIORITY

The present patent application claims priority under 35 U.S.C. § 119(e) to the following U.S. Provisional Patent Applications, the full disclosures of which are each incorporated herein by reference:

U.S. Provisional Patent Application Ser. No. 60/413,251; filed on Sep. 24, 2002, entitled "Dual Antenna Adaptive Compensation Algorithm," of Brenner et al.;

U.S. Provisional Patent Application Ser. No. 60/413,211; filed on Sep. 24, 2002, entitled "Low Power Detection and Compensation for Satellite Systems," of Brenner;

U.S. Provisional Patent Application Ser. No. 60/413,252; filed on Sep. 24, 2002, entitled "Signal Deformation Monitor," of Brenner; and U.S. Provisional Patent Application Ser. No. 60/413,080; filed on Sep. 24, 2002, entitled "Radio Frequency Interference Monitor," of Brenner.

RELATED APPLICATIONS

This application is related to the following concurrently filed U.S. Applications, which are incorporated by reference herein:

U.S. patent application Ser. No. 10/667,830; filed on Sep. 22, 2003, entitled "Radio Frequency Interference Monitor," to Brenner.

U.S. patent application Ser. No. 10/667,854; filed on Sep. 22, 2003, entitled "Signal Deformation Monitor," to Brenner.

U.S. patent application Ser. No. 60/413,251; filed on Sep. 24, 2002, entitled "Dual Antenna Adaptive Compensation Algorithm," to Brenner et al.

FIELD OF THE INVENTION

The present invention relates generally to satellite navigational systems, and more particularly, relates to measuring the accuracy of navigational variables.

BACKGROUND

A global positioning system (GPS) measures the three-dimensional, global position of a radio receiver, using the distances between the radio receiver and a number of earth-orbiting satellite transmitters. The receiver, usually mounted to a vehicle such as a commercial passenger aircraft, receives signals from the satellite transmitters. Each signal indicates both the position of its transmitter and its transmission time, enabling the receiver, equipped with its own clock, to approximate signal transit times and to estimate the distances to the transmitters. A processor coupled to the receiver uses at least four of these distances, known as pseudoranges, to approximate or estimate the position of the receiver and the associated vehicle. The accuracy of these estimates, or position solutions, depends on a number of factors, for example, changing atmospheric conditions and performance of individual satellite transmitters.

In commercial aircraft navigation and guidance, global positioning systems (GPSs) have traditionally been used only for determining position of an aircraft during non-critical portions of a flight, that is, between takeoff and landing. However, in recent years, researchers have started extending GPSs for use during landings. These extended systems have taken the form of ground-augmented or differential global positioning systems which typically include two to four ground-based GPS receivers and a ground-based differential correction processor (DCP) and a correction-data transmitter, all located around an aircraft landing area.

In 1998, the FAA initiated a program to develop requirements for developing and deploying such a navigational system known as the GPS-based Local-Area-Augmentation Systems, or GPS-based LAASs. As a result of this program, the FAA released Specification, FAA-E-2937A (Apr. 17, 2002), which establishes the performance requirements for a Category I Local Ground Facility (LGF) in the LAAS system. The contents of FAA-E-2937A are incorporated herein by reference. Under this specification, the LGF will monitor the satellite constellation, provide the LAAS corrections and integrity data, and provide approach data to and interface with air traffic control.

The LAAS uses a differential global positioning system (DGPS). The DGPS includes a global positioning system (GPS) and at least one ground station. The GPS uses a number of orbiting position transmitting satellite stations and a receiver on an aircraft to determine the position of the aircraft with respect to ground. With the satellite information, the receiver can determine the position, speed, and altitude of the aircraft. By adding a ground station, the DGPS can correct errors that may occur in the transmission of data from the satellites to the receiver. As a result the DGPS can determine the position of the aircraft with a high degree of accuracy.

The ground-based GPS receivers, each with a known position, work as normal GPS receivers in determining respective sets of pseudoranges based on signals from at least four earth-orbiting satellite transmitters. These pseudoranges are fed to the ground-based DCP, which uses them and the known positions of the ground receivers to determine correction data. The correction-data transmitter then transmits to aircraft approaching the landing area. These approaching aircraft use the correction data to correct position estimates of on-board GPS receivers, providing better position solutions than possible using their on-board GPS receivers alone.

These corrected position solutions are then compared to a reference landing path to determine course deviations necessary to ensure the aircraft follows the reference landing path. The course deviations are input to an autopilot system, which guides the aircraft during automatic landings. For the autopilot system to function within safety limits set by the Federal Aviation Administration, the position estimates are required to stay within minimum accuracy limits known as vertical and lateral alert limits. Failure to stay within accuracy limits causes issuance of an alert, signaling a pilot to abort the automatic landing and to restart the landing process.

In a navigational system used in commercial aircraft, accuracy is of paramount importance. However, as in all navigational systems, a certain amount of error will inevitably exist. This error must be prepared for, monitored, and dealt with. One potential source of error identified in the LGF specification is low signal power, whether in the satellite signals received by the LGS or in the satellite and ground signals received by the aircraft. A measure of the accuracy used in navigation is the "error bound," also referred to as the "protection limit" or "integrity limit." The error bound reflects a range of values within which—to a predetermined confidence level set by regulations or by industry standards—the aircraft is likely to be located.

SUMMARY

In a satellite navigation system, a low-power error system is provided for detecting a low-power condition in a navigational system and adjusting the error bound to compensate for the low-power condition. In one embodiment, the system includes a first detector for detecting wide band power and a second detector for detecting narrow band power, and a processor. The processor includes logic for computing the signal-to-noise ratio and logic for adjusting the error bound based on the signal-to-noise ratio. The logic for computing the signal-to-noise ratio may include logic for computing a lower confidence limit for the signal-to-noise ratio.

BRIEF DESCRIPTION OF THE DRAWINGS

Presently preferred embodiments are described below in conjunction with the appended drawing figures, wherein like reference numerals refer to like elements in the various figures, and wherein.

DETAILED DESCRIPTION

I. Overview

A. The Nature of a Low-Power Condition

Figure 3:
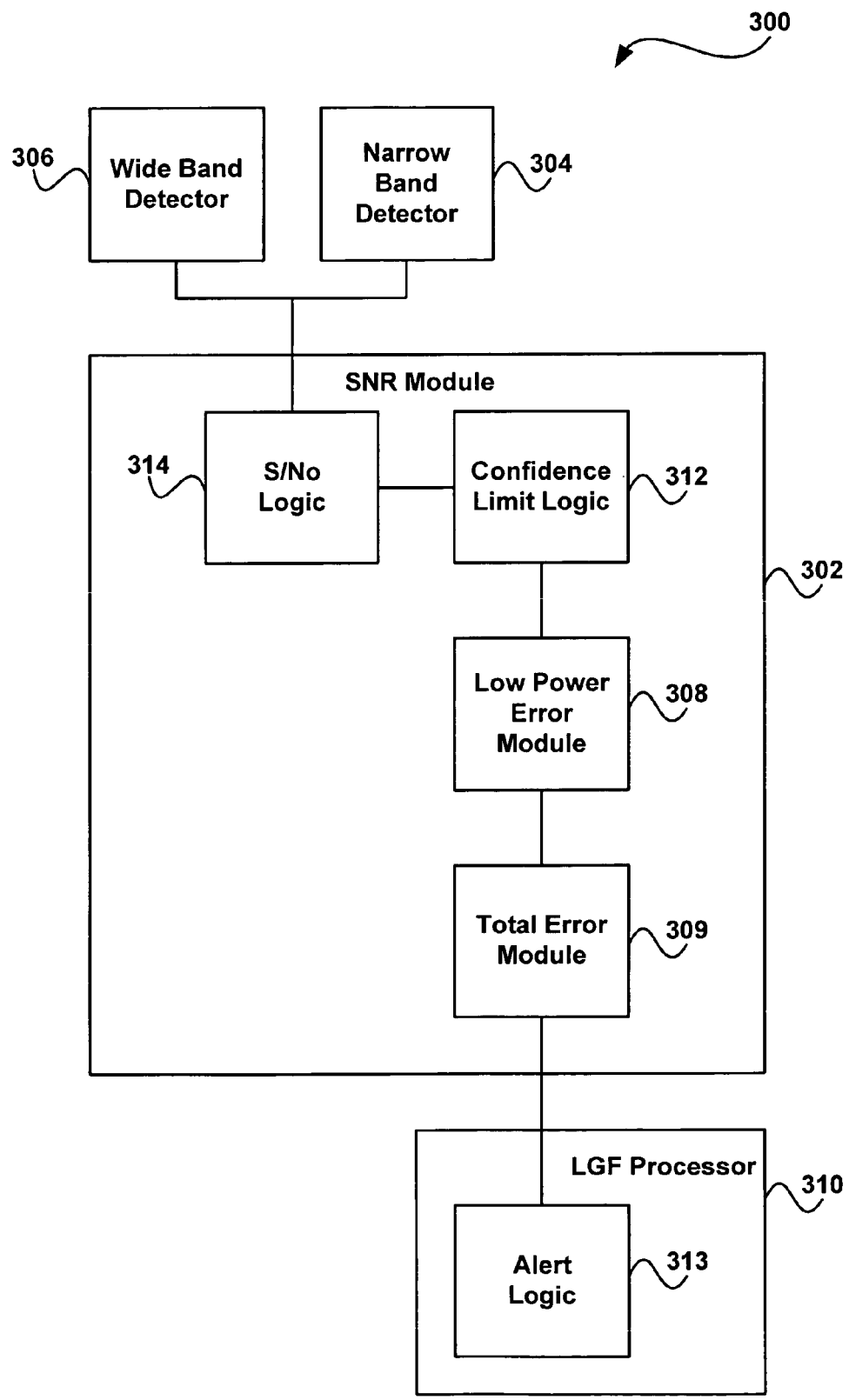
FIG. 3 is a block diagram of a low-power error system according to an exemplary embodiment.

A low-power error system for detecting a low power condition may be employed in a variety of satellite navigation systems but is preferably implemented in a LAAS system using DGPS. As illustrated in FIG. 3, the low-power error system may be implemented in a LGF, but it may equally well be used in an aircraft using the LAAS system.

In a "low power" condition, the navigational signal received by the system from at least one of the GPS satellites (or, where the system is located in an aircraft, from the LGF) is weak relative to the noise level. A low power condition may be caused either because the signal itself is weak (e.g., where the satellite signal has been blocked or deflected by atmospheric or terrestrial conditions) or because the level of ambient noise is high (e.g., interference from terrestrial radio transmissions), or a combination of the two. A low power condition is characterized by the signal-to-noise ratio ("S/No") of the navigational signal. Where the signal has a low power, or the level of noise is high, the S/No is relatively low.

B. Detecting a Low-Power Condition

In a LAAS system, a method is provided for detecting and compensating for low-power conditions. As is described in further detail in section II, below, the system receives a satellite radio signal and uses the signal to determine a navigational measurement, such as position, velocity, acceleration, time, or other measurement. The system measures narrow band power and wide band power around the frequency of the satellite radio signal, and it calculates in real time an estimate of the signal-to-noise ratio based on the narrow band and wide band power. To assure error overbounding, system may use a lower confidence limit as its estimate of the signal-to-noise ratio. The lower confidence limit is calculated by determining the signal-to-noise ratio from the narrow band and wide band power and then subtracting a confidence offset from the result.

Based on the estimate of the signal-to-noise ratio, the system determines the component of error in the navigational measurement that is attributable to thermal and broadband white noise. That error component is combined with other error components to determine the total error, and the system determines whether the error bound for the navigational measurement has been exceeded.

II. Detecting a Low Power Condition

Figure 1:
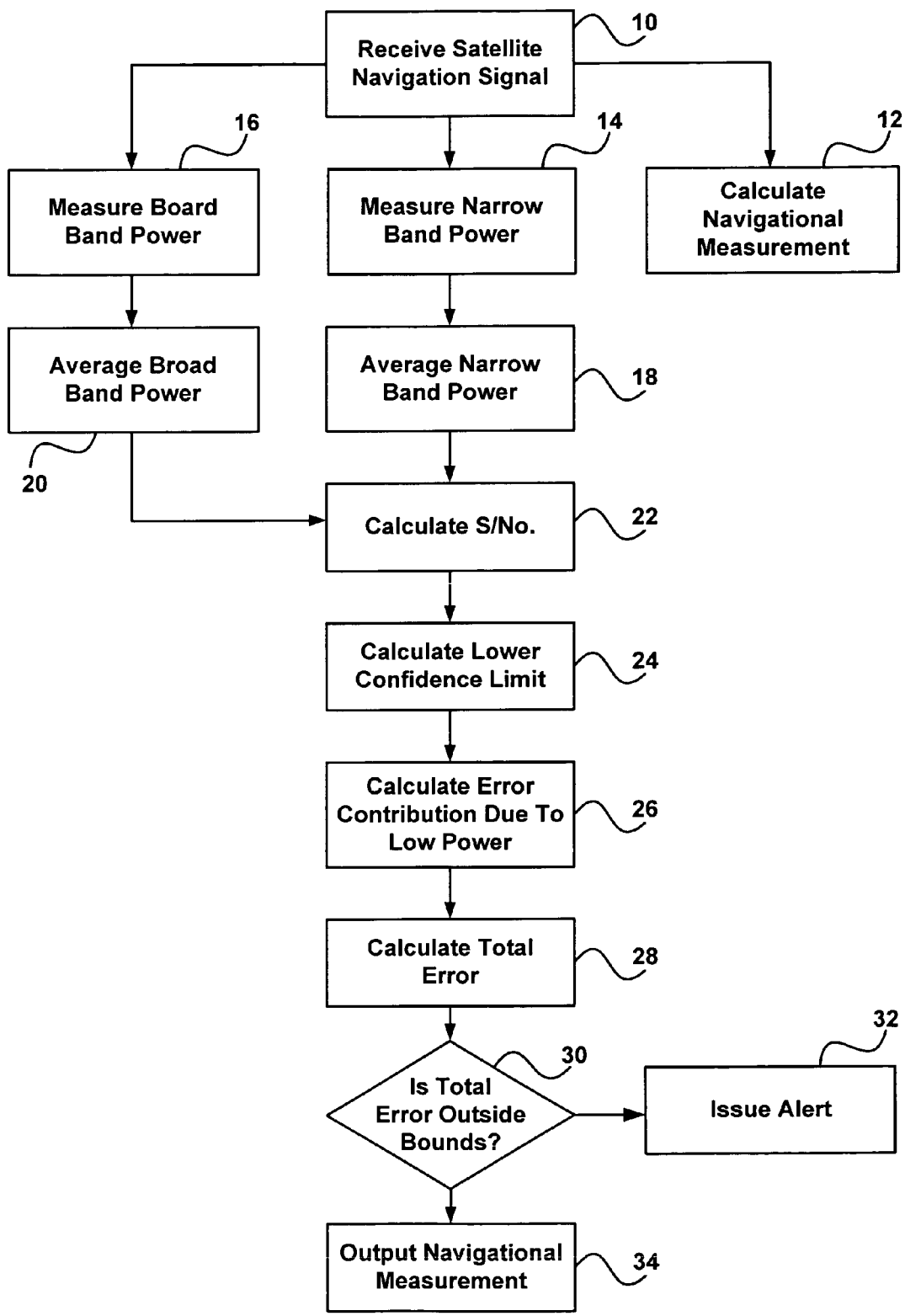
FIG. 1 is a flow diagram illustrating the detection of a low-power error condition.

The steps performed in the detection of a low-power condition in a satellite navigation system is described in detail with reference to FIG. 1.

A. Determining the Signal-to-Noise Ratio

A LAAS system receives a satellite navigation signal at step 10 and calculates a navigational measurement (step 12) in response to the signal. In a preferred embodiment, the signal is received from a GPS satellite. The system also detects one or more observable variables and calculates the signal-to-noise ratio based on the values of the observable variables. Preferably, the observable variables are measured on a periodic basis to provide real-time monitoring of the signal-to-noise ratio. In general, where the detector monitors variables a, b, c, etc., the logic estimates the signal-to-noise ratio based on an algorithm or mathematical function denoted $f_{snr}$, as follows:

$$S/No = 10 \log_{10} [f_{snr}(a, b, c, \ldots)] \quad \text{(Equation 1)}$$

In a preferred embodiment, the observable variables are the narrow band power and the wide band power of the satellite navigation signal received by a GPS receiver at the LAAS system. In that case the system detects $P_n$, the narrow band power (step 14) and $P_w$, the average wide band power (step 16). The wide band power $P_w$ is measured as an average over the time interval T, which preferably remains constant at 1 ms. The narrow band power $P_n$ is preferably measured as an average over a period that is M times as long as period T. Thus, for each measurement of $P_n$, there are M measurements of $P_w$. Preferably, M is equal to 20.

The system calculates the signal-to-noise ratio in real time based on the measurements of $P_n$ and $P_w$, together with the values of the constants T and M, according to the following formula:

$$S/No = 10 \log_{10} \left[ \frac{1}{T} \frac{P_n - P_w}{MP_w - P_n} \right] \quad \text{(Equation 2)}$$

The signal-to-noise ratios given by the above formulae express the result in decibels, according to normal engineering practice. It should be noted that the result need not be expressed in decibels (for example, the operator $10 \log_{10} [\ldots]$ may be omitted) so long as future calculations are adjusted accordingly.

Preferably, the system calculates the signal-to-noise ratio as an average over several samples, where K is the number of samples, each one having a duration $T_s$ equal to MT. Preferably, the average is taken by averaging the observables themselves (such as $P_n$ and $P_w$) over the K samples before calculating the signal-to-noise ratio. For example, the system may average the narrow band power at step 18 and average the wide band power at step 20 before calculating the signal-to-noise ratio at step 22. However, the averaging may take place at any other point in the process, for example by calculating S/No for each sample and averaging the result over the K samples to obtain an average S/No. The estimate of the signal-to-noise ratio becomes more accurate with more samples K.

As is described in further detail in section II.C, below, the estimate of the signal-to-noise ratio may be adjusted to a lower confidence limit (step 24) to reduce the likelihood that the estimate of the signal-to-noise ratio will be unduly low and will result in unwarranted confidence in the navigational measurement.

B. Calculating Error

As noted above, the system may be used to determine any of a number of navigational measurements such as position, velocity, acceleration, or time, or other measurements. The value of one of these navigational measurements is designated herein by the variable A. The error in the value of A is represented by a sigma value $\sigma_A$, where a 1-sigma $\sigma_A$ represents one standard deviation in the measured value of A. The 1-sigma $\sigma_A$ has several components reflecting all error sources in the satellite signal and signal tracking system. One of these components is the component $\sigma_w$, which reflects the impact of thermal and broadband white noise. The components of the error are additive in their squares, so that the total $\sigma_A$ from wideband noise and other sources may be calculated as follows:

$$\sigma_A^2 = \sigma_w^2 + \sigma_{other}^2 \qquad \text{(Equation 3)}$$

The system uses the estimate of the signal-to-noise ratio obtained as described in section II.A, above, to calculate the error contribution $\sigma_w$ from wide band sources (step 26). The system calculates the error contribution with a function of the following format:

$$\sigma_w = f_{sig}(S/No) \qquad \text{(Equation 4)}$$

In a preferred embodiment, in which A is measured by a GPS system, the error contribution is calculated to the first order according to the following formula:

$$\sigma_w = \sqrt{\frac{d \times B}{2 \times 10^{(S/No)/10}}} \text{ chip} \qquad \text{(Equation 5)}$$

where the observed variables are as follows:
S/No is the signal-to-noise ratio, expressed in decibels
B is the bandwidth
d is the correlator spacing and the constants are as follows:
chip: (1 ms/1023) c
c: speed of light After the system determines the value of the error contribution $\sigma_w$, the system sums the value of $\sigma_w^2$ with other error contributions (step 28) to calculates the error bound for the measurement of A. If the error bound for A falls outside of an alert limit (step 30), such as a limit set by FAA regulations or industry practice, the system may issue an alert (step 32). Such an alert could, for example, direct a pilot to abort a landing attempt or to rely on different navigational aids during the landing. Otherwise, the navigational measurement calculated in step 12 may be reported to the pilot (step 34).

C. Determining the Lower Confidence Limit

As noted above, the estimate of the signal-to-noise ratio S/No may include errors caused at least in part by the finite sample size. The actual signal-to-noise ratio differs from the estimated signal-to-noise ratio by a deviation dS/No.

$$\text{actual signal-to-noise ratio} = S/No + dS/No \qquad \text{(Equation 6)}$$

When the value of dS/No is strongly negative, the estimate of S/No is high, and a system could overestimate the signal-to-noise ratio. As a result, the system could determine that the error in the navigation measurement is relatively low and users of the navigational system could potentially operate with unwarranted confidence in the accuracy of the measurement.

To prevent unwarranted confidence on an inaccurate measurement of the signal-to-noise ratio, the system may overbound the error by adjusting the signal-to-noise ratio estimate to a lower confidence limit S/No_low_lim (step 24). As a result, negative values of the deviation dS/No are much less likely to result in an unacceptably low error measurement.

In a preferred embodiment, the system determines the lower confidence limit S/No_low_lim by subtracting a confidence offset dS/No_low from the signal-to-noise ratio estimate S/No.

$$S/No\_low\_lim = S/No - dS/No\_low \qquad \text{(Equation 7)}$$

To reduce the likelihood of underestimating the error $\sigma_w$, it is desirable for the lower confidence limit S/No_low_lim to be no greater than the actual signal-to-noise ratio. The probability of this occurring is expressed as P(dS/No≧−dS/No_low), or $P_{lim}$. The value of the confidence offset dS/No_low is set by determining an acceptable probability $P_{lim}$ that the error $\sigma_w$ will be correct (i.e., that it will not be underestimated), and then determining what value of the confidence offset dS/No_low is required to achieve that probability.

The probability $p_{lim}$ represents the limit on the probability per time interval $KT_s$ that the error $\sigma_w$ (as calculated from the estimated signal-to-noise ratio) is incorrect, The value of $p_{lim}$ is determined in advance by regulations or industry standards governing the integrity allocated to the particular type of fault expressed as a probability per unit of time. Such regulations may indicate, for example, that $p_{lim}$ may be no greater than $10^{-7}/150$ seconds. The value $P_{lim}$, in contrast, represents the probability per time interval $KT_s$ that the calculated $\sigma_w$ is correct. Thus:

$$p_{lim} = 1 - P_{lim} \qquad \text{(Equation 8)}$$

Once an acceptable value of $P_{lim}$ has been determined, a confidence offset is calculated so that the acceptable value of $P_{lim}$ will be obtained. One technique for calculating the confidence offset makes use of the probability distribution of dS/No. The deviation dS/No of the actual signal-to-noise ratio from the value S/No has a probability distribution represented by the probability density function pdf(x), where x represents all possible deviations dS/No. The function pdf(x) can be derived from the equation for $\sigma_w$, such as Equations 3 or 4, above.

After the function pdf(x) has been determined and the value of $P_{lim}$ selected, the confidence offset dS/No_low is determined by solving Equation 9 for dS/No_low:

$$P_{lim} = \int_{-dS/No\_low}^{\infty} pdf(x)dx \qquad \text{(Equation 9)}$$

In real-time operation, the system calculates the lower confidence limit (step 24) by subtracting the confidence offset dS/No_low from the estimated value of S/No. The system then uses the lower confidence limit as the signal-to-noise ratio in calculating the error (step 26). Thus, to increase confidence in the sigma result, the system uses the value of S/No_low_lim to calculate the value of $\sigma_w$ according to the equation:

$$\sigma_w = f_{sig}(S/No - dS/No\_low) = f_{sig}(S/No\_low\_lim) \quad \text{(Equation 10)}$$

The use of the S/No_low_lim in place of S/No ensured that the calculated sigma will overbound any error due to the low power condition.

III. An Exemplary Low-Power Detection System

In a preferred embodiment, the system for detecting a low-power condition is implemented in a LAAS system, which augments a differential global positioning satellite (DGPS) system. A LAAS system, such as the system 100 illustrated in FIG. 2, includes a plurality of satellites 102 and a LAAS Ground Facility (LGF) 200. The LAAS system provides precision approach data and landing capability to an aircraft 104.

The plurality of satellites 102 provides the aircraft 104 and the LGF 200 with GPS ranging signals and orbital parameters. The LGF 200 receives the satellite signals through at least one reference receiver 202, a DGPS cabinet 204, and at least one VDB cabinet 206. The LGF 200 provides differential corrections, integrity parameters, and precision approach pathpoint data to the aircraft 104 by way of the VDB cabinet 206. Communication between the LGF and the aircraft 104 is conducted using Very High Frequency (VHF) Data Broadcast (VDB). The aircraft 104 may apply the LGF corrections to the GPS ranging signals to accurately determine its position.

In one embodiment, the system for detecting a low-power condition is implemented at the LGF 106. As illustrated in FIG. 3, a system 300 for detecting a low-power condition includes a signal-to-noise ratio module ("SNR module") 302 for calculating the signal-to-noise ratio of a navigational signal. A narrow band detector 304 determines the narrow band power $P_n$, and a wide band detector 306 determines the average wide band power $P_w$. The SNR module includes S/No logic 314 for estimating the signal-to-noise ratio S/No based at least in part on the narrow band and wide band power, as described in section II.A. Preferably, the detectors 304 and 306 provide measurements on a periodic basis to enable real-time monitoring of the signal-to-noise ratio.

Figure 2:
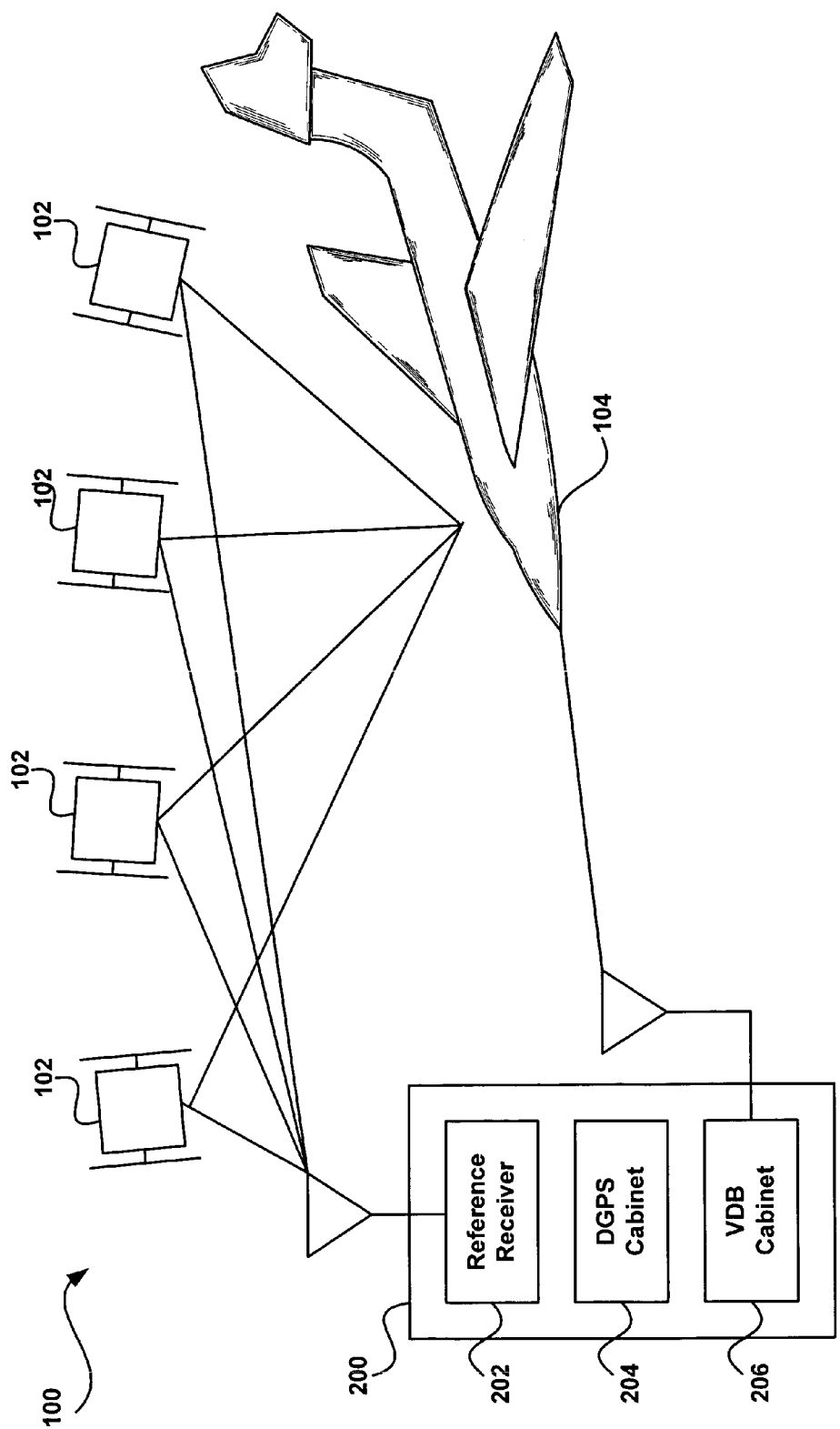
FIG. 2 is a block diagram of a LAAS system.

Confidence limit logic 312 in the SNR module calculates the lower confidence limit from the estimated value of S/No as described in section II.C, above. A low-power error module 308 receives the lower confidence limit and calculates the 1-sigma error $\sigma_w$ attributable to wide band and thermal noise, as described in section II.B, above. A total error module 309 receives the error $\sigma_w$ and error contributions calculated from other sources (not illustrated) and sums the errors as described in section II.B to determine a total error. The total error and/or the low power error $\sigma_w$ is reported to an LGF processor 310. Alert logic 313 in the LGF processor detects whether the total error has exceeded an error bound and issues an alert. The alert may be transmitted to the aircraft 104 by the VDB cabinet 206 (FIG. 2).

The functions of each of the modules of the error compensation system may be implemented in a combination of software, firmware, and/or hardware. For example, the system 300 may be implemented by executable instructions stored in a computer memory and executed by a processor. In a preferred embodiment, the system is software based and may be stored and executed in the DGPS Cabinet 204 (FIG. 2).

The components of the system 300 may be implemented by software.

Although the present invention has been described with reference to preferred embodiments, workers skilled in the art will recognize that changes may be made in form and detail without departing from the spirit and scope of the invention. In particular, those in the art will recognize that a single processor could perform all the operations for implementing the invention or that multiple processors could share these operations. Moreover, the method itself could be divided over distinct functional units other than those used for illustration here. Of course, other changes in form and detail are also within the spirit and scope of the invention.

The invention claimed is:

1. A method of detecting a low power condition in a local area augmentation system, comprising:

receiving at least one global positioning satellite radio signal;

measuring an average wide band power associated with the radio signal;

measuring an average narrow band power associated with the radio signal;

calculating a signal-to-noise ratio of the radio signal from the wide band power and the narrow band power;

calculating a lower confidence limit of the signal-to-noise ratio, wherein the lower confidence limit is calculated at least in part from the calculated signal-to-noise ratio;

determining, from the lower confidence limit, a low-power condition error contribution, calculating a total error in a navigational measurement based at least in part on the low-power condition error contribution;

determining whether the total error exceeds an alert limit; and issuing an alert if the total error exceeds the alert limit.

2. The method of claim 1, wherein measuring a wide band power includes averaging the wide band power over the first time period to obtain a value $P_w$, and wherein measuring a narrow band power includes averaging the narrow band power over the second time period to obtain a value $P_n$.

3. The method of claim 2, wherein the first time period has a length T, the second time period has a length that is M times as long as T, and the signal-to-noise ratio S/No is calculated according to the following equation:

$$S/No = 10 \log_{10}\left[\frac{1}{T}\frac{P_n - P_w}{MP_w - P_n}\right]$$

4. The method of claim 1, further comprising:

determining a navigational measurement based at least in part on the received radio signal;

wherein the low-power error contribution is an error in the navigational measurement.

5. A method of detecting a low power condition in a local area augmentation system, comprising:

receiving at least one global positioning satellite radio signal;

measuring an average wide band power associated with the radio signal;

measuring an average narrow band power associated with the radio signal;

calculating a signal-to-noise ratio of the radio signal from the wide band power and the narrow band power;

calculating a lower confidence limit of the signal-to-noise ratio;

determining, from the lower confidence limit, a low-power condition error contribution, calculating a total error in a navigational measurement based at least in part on the low-power condition error contribution;

determining whether the total error exceeds an alert limit; and issuing an alert if the total error exceeds the alert limit wherein determining the lower confidence limit comprises subtracting a confidence offset from the calculated signal-to-noise ratio.

6. The method of claim 5, wherein the confidence offset dS/No_low is determined by the following equation:

$$P_{lim} = \int_{-dS/\text{No\_low}}^{\infty} pdf(x)\,dx.$$

7. In a local area augmentation system, a system for detecting a low-power condition comprising:

a receiver operative to receiving at least one global positioning satellite radio signal;

a wide band power estimator operative to measure an average wide band power;

a narrow band power estimator operative to measure an average wide band power;

a signal-to-noise ratio module operative to determine a signal-to-noise ratio from the estimated wide band power and the estimated narrow band power;

a confidence limit logic module operative to calculate a lower confidence limit of the signal-to-noise ratio, wherein the lower confidence limit is calculated at least in part from the calculated signal-to-noise ratio;

a total error module operative to calculate a total error based at least in part on the lower confidence limit; and alert logic operative to determine whether the total error exceeds an alert limit and to issue an alert if the total error exceeds the alert limit.

8. A method of detecting a low power condition in a local area augmentation system, comprising:

receiving at least one global positioning satellite radio signal;

measuring an average wide band power associated with the radio signal;

measuring an average narrow band power associated with the radio signal;

calculating a signal-to-noise ratio of the radio signal from the wide band power and the narrow band power;

calculating a lower confidence limit of the signal-to-noise ratio;

determining, from the lower confidence limit, a low-power condition error contribution, calculating a total error in a navigational measurement based at least in part on the low-power condition error contribution;

determining whether the total error exceeds an alert limit; and issuing an alert if the total error exceeds the alert limit;

wherein measuring a wide band power includes averaging the wide band power over the first time period to obtain a value $P_w$, and wherein measuring a narrow band power includes averaging the narrow band power over the second time period to obtain a value $P_n$; and wherein the first time period has a length T, the second time period has a length that is M times as long as T, and the signal-to-noise ratio S/No is calculated according to the following equation:

$$S/No = 10\log_{10}\left[\frac{1}{T}\frac{P_n - P_w}{MP_w - P_n}\right]$$

* * * * *